(12) United States Patent
Yoshida et al.

(10) Patent No.: US 8,157,982 B2
(45) Date of Patent: Apr. 17, 2012

(54) METHOD OF EXTRACTING HEXAVALENT CHROMIUM

(75) Inventors: Hideo Yoshida, Tokorozawa (JP); Morihisa Shindo, Higashimurayama (JP)

(73) Assignee: Hideo Yoshida, Saitama (JP)

( * ) Notice: Subject to any disclaimer, the term of this patent is extended or adjusted under 35 U.S.C. 154(b) by 1037 days.

(21) Appl. No.: 11/666,268

(22) PCT Filed: Apr. 12, 2006

(86) PCT No.: PCT/JP2006/007708
§ 371 (c)(1),
(2), (4) Date: Apr. 25, 2007

(87) PCT Pub. No.: WO2006/123489
PCT Pub. Date: Nov. 23, 2006

(65) Prior Publication Data
US 2008/0087553 A1    Apr. 17, 2008

(30) Foreign Application Priority Data
May 18, 2005   (JP) ................................ 2005-144858

(51) Int. Cl.
*C25F 5/00* (2006.01)
(52) U.S. Cl. .................. 205/705; 205/710; 205/717
(58) Field of Classification Search ........... 205/704–723
See application file for complete search history.

(56) References Cited

U.S. PATENT DOCUMENTS

| | | | | |
|---|---|---|---|---|
| 1,863,868 A | * | 6/1932 | McCullough | 205/717 |
| 2,548,419 A | * | 4/1951 | Chester et al. | 205/197 |
| 2,796,372 A | * | 6/1957 | Chester et al. | 148/266 |
| 5,981,084 A | * | 11/1999 | Riabkov et al. | 428/612 |
| 6,398,876 B1 | * | 6/2002 | Starcevic et al. | 134/3 |

FOREIGN PATENT DOCUMENTS

| | | |
|---|---|---|
| JP | 02-159400 | 6/1990 |
| JP | 09-126710 | 5/1997 |
| JP | 11-169814 | 6/1999 |
| JP | 2003-062541 | 3/2003 |
| JP | 2003-112143 | 4/2003 |
| JP | 2005-087988 | 4/2005 |
| JP | 2006-089817 | 4/2006 |

OTHER PUBLICATIONS

Ndung'u et al. Ultrasonic extraction of hexavalent chromium in solid samples followed by automated analysis using a combination of supported liquid membrane extraction and UV detection in a flow system. 1999. Analyst, 124, pp. 1367-1372.*

* cited by examiner

*Primary Examiner* — Arun S Phasge
(74) *Attorney, Agent, or Firm* — Jordan and Hamburg LLP

(57) ABSTRACT

Hexavalent chrome is extracted from a film on a workpiece which film contains hexavalent chrome and reduced by contacting the contacting workpiece with a liquid or fine particle reducing agent.

4 Claims, 2 Drawing Sheets

METHOD OF EXTRACTING HEXAVALENT CHROMIUM

BACKGROUND OF THE INVENTION

This invention relates to a method of extracting hexavalent chrome capable of reliably and cost-efficiently extracting hazardous hexavalent chrome remaining on the surface or inside of chrome plating or chromate film without a need of a special and expensive equipment, preventing elution of the hexavalent chrome from a raw material to be processed, enjoying safe use and discarding of the part where the hexavalent chrome remains, and preventing environmental pollution and adverse effect to a human body.

Various surface processing such as plating and chemical treatment are applied to a raw material such as iron, nonferrous metal and synthetic resin for the purposes of rust-proof, decoration, modification and the like. Among them, chrome plating is widely adopted in the field of automobiles, electronics and electric equipments as decorative chrome plating or industrial chrome plating because the chrome plating is excellent in decorative property, corrosion resistance and wear resistance.

The chrome plating bath generally requires a large amount of chromic acid, i.e., hexagonal chrome as a supplying source of chromic ions. Therefore, a careful countermeasure is needed for safety, sanitation, pollution, etc. Moreover, it is pointed out that hexavalent chrome remaining in the deposited metallic chrome and chrome oxide is eluted by rain water or the like to pollute the underground water and environment and gives a significant adverse effect to a human body.

In view of the above, legal restriction is studied in the Euro-American automobile industry, for reducing the consuming amount of hexavalent chrome and for prohibiting the use of the same. Similar movements can be seen in the electronic and electric equipment industries. Movements following thereto can also be seen in Japan.

Moreover, a chromating processing as the above-mentioned chemical treatment is used as a post-treatment of zinc plating products and cadmium plating products. In such processing, a workpiece as a raw material to be processed is immersed in an elution which chiefly contains chrome acid or heavy chrome acid, so that an anticorrosive film as a thin passivated film is generated on the surface of the workpiece. Here again, it is pointed out that the hexavalent chrome remaining on the surface of the workpiece is eluted by rain water which results in environmental pollution and gives significant adverse effect to a human body.

Thus, it is urgently required to develop technique which can take the place of the hexavalent chrome or chromating processing. The main stream of the development is a trivalent chrome basis. There are many in which a film of trivalent chrome is top-coated. Although those alternative techniques are capable of producing, at a test level, products equivalent to the hexavalent or chromating processing, there still remains a problem at a mass production level, and no sufficient products are obtained yet.

On the other hand, the existing chrome plated or chromate-processed parts have the afore-mentioned problem of environmental pollution caused by elusion of hexavalent chrome and so, those contaminate parts cannot be discarded directly. Moreover, since use of the existing parts is not reliable, it is urgently required to solve those problems.

Particularly, WEEE instructions and RoHS instructions pertaining to the limitation of use of hazardous substances contained in electronic and electronic equipments are expected to come to be effective in near future in Euro-countries. Like restrictions are also expected to come in force in Japan. Thus, a countermeasure is urgently required.

As solving means for coping with those problems, there are some methods of extracting or removing hexavalent chrome.

For example, there is known a method which includes a reaction vessel for adding a reducing agent to a factory effluent therein and a precipitation vessel for generating chrome precipitates by adding a precipitant to the effluent introduced from the reaction vessel, measuring means for measuring the hexavalent chrome concentration in the effluent being disposed at a pipeline for connecting those vessels and an effluent feed pipeline, the amount of the reducing agent to be added being controlled based on the value measured by the measuring means, blocking of the pipeline caused by the chrome precipitates being prevented by adjusting the amount of the chrome precipitates, thereby efficiently removing the chrome remaining in the effluent (for example, see Japanese Patent 1).

However, since the above-mentioned chrome removing method is designed for removing the hexavalent chrome in the effluent, it is unable to cope with the requirements for removing the hexavalent chrome remaining in a solid workpiece. Moreover, the equipment necessary for carrying out this method is expensive because it requires a reaction vessel, a precipitation vessel. measuring means and the like. In addition, a space for installing those component parts is large.

As a method capable of solving those problems, there is known a method for processing a hexavalent chrome-containing waste including a mixing step for making a mixture by adding and mixing a reducing agent to a hexavalent chrome-containing waste such as magnesia-chrome brick and chrome-magnesia brick containing Mg(II) and Cr(III), and hazardous Cr (IV), a reducing step for reducing Mg(II) to a metallic magnesium by heating the mixture in an oxygen non-containing atmosphere and reducing and non-polluting Cr (IV), and a separating and collecting step for separating and collecting a metallic magnesium from the reduced mixture by evaporating the metallic magnesium simultaneously with the reducing process (see Japanese Patent 2).

In the above-mentioned processing method, the magnesia-chrome brick is not used as it is. The method requires a step for pulverizing the magnesia-chrome brick into fine powders as well as a pulverizing equipment. Thus, much time and labor are required for processing the waste and in addition, a complicate and troublesome step is required. Thus, productivity is poor.

Japanese Patent 1: Japanese Patent Application Laid-Open No. 2005-87988.

Japanese Patent 2: Japanese Patent Application Laid-Open No. H11-169814.

It is an object of the present invention to provide, in order to solve the above-mentioned problems, a hexavalent chrome extracting method capable of reliably and cost-efficiently extracting hazardous hexavalent chrome remaining on the surface or inside of chrome plating or chromate film without a need of a special and expensive equipment, preventing elution of the hexavalent chrome from a raw material to be processed, enjoying safe use and discarding of a part where the hexavalent chrome remains, and preventing environmental pollution and adverse effect to a human body.

SUMMARY OF THE INVENTION

The present invention provides, in a method of extracting hexavalent chrome remaining in a raw material (workpiece) to be processed, a hexavalent chrome extracting method comprising contacting a workpiece having a film where hexavalent chrome remains with a liquid or fine particle reducing agent and extracting the hexavalent chrome from the film. By virtue of this feature, the hexavalent chrome can be extracted from a tangible workpiece where hexavalent chrome remains easily, rapidly and inexpensively.

Moreover, according to a hexavalent chrome extracting method of the present invention, the workpiece having a film where the hexavalent chrome remains is contacted with the reducing agent while maintaining a strictly or approximately strictly original shape of the workpiece. By virtue of this feature, the hexavalent chrome can be extracted basically in the prior-processing state of the solid workpiece and without crushing the raw material or without pulverizing the same. Thus, an easy, rapid and inexpensive extracting method is realized, and the mass production of the extracting process can be met.

Moreover, in a hexavalent chrome extracting method of the present invention, the workpiece having a film where the hexavalent chrome remains after chromate processing or before discarding is contacted with the reducing agent. By virtue of this feature, this method is suited for extraction of hexavalent chrome remaining in the chromate film or chrome plating film. An extracting process can be met both in the producing process of the workpiece or in the discarding process of the same. Thus, the part where the hexavalent chrome remains can be processed properly, and such part can be used and discarded safely, thereby preventing the environmental pollution and adverse effect to a human body. Thus, this method can cope with the expected WEEE instructions, RoHS instructions and the like, as well as the expected restriction in Japan.

In a hexavalent chrome extracting method according to the present invention, the workpiece having a film where the hexavalent chrome remains is immersed in the reducing agent and ultrasonic sound waves are emitted to the reducing agent. Owing to this feature, by using the ultrasonic sound waves together with the reducing agent for extracting the hexavalent chrome, the hexavalent chrome can be extracted rapidly and precisely.

In a hexavalent chrome extracting method according to the present invention, the hexavalent chrome extracted from the film where hexavalent chrome remains is reduced to trivalent chrome through the reducing agent. By virtue of this feature, the reducing agent can be used both for extraction of hexavalent chrome and for reduction of the same to trivalent chrome. Thus, the reducing agent can be used reasonably.

From another aspect, the present invention also provides in a method for extracting hexavalent chrome remaining in a raw material (workpiece) to be processed, a hexavalent chrome extracting method comprising contacting a workpiece having a film where hexavalent chrome remains with a liquid or fine particle electrolyte, applying a positive or negative voltage to the workpiece and extracting the hexavalent chrome from the film. Owing to this feature, by forcibly and rapidly extracting the hexavalent chrome remaining in the workpiece, the performance of extracting process can be enhanced and the extracting precision can also be enhanced.

In a hexavalent chrome extracting method according to the present invention, the workpiece having a film where the hexavalent chrome remains is contacted with the electrolyte while maintaining a strictly or approximately strictly original shape of the workpiece. By virtue of this feature, the hexavalent chrome can be extracted basically in the prior-processing state of the solid workpiece and without crushing the raw material or without pulverizing the same. Thus, an easy, rapid and inexpensive extracting method is realized, and the mass production of the extracting process can be met.

Moreover, in a hexavalent chrome extracting method according to the present invention, the workpiece having a film where the hexavalent chrome remains after chrome plating or before discarding is contacted with the electrolyte. Owing to this feature, this method is suited for extraction of hexavalent chrome remaining in the chromate film or chrome plating film. An extracting process can be met both in the producing process of the workpiece or in the discarding process of the same. Thus, the part where the hexavalent chrome remains can be processed properly, and such part can be used and discarded safely, thereby preventing the environmental pollution and adverse effect to a human body. Thus, this method can cope with the expected WEEE instructions, RoHS instructions and the like, as well as the expected restriction in Japan.

In a hexavalent chrome extracting method according to the present invention, the workpiece having a film where the hexavalent chrome remains is immersed in the electrolyte and ultrasonic sound waves are emitted to the electrolyte. Owing to this feature, by using the ultrasonic sound waves together with the electrolyte for extracting the hexavalent chrome, the hexavalent chrome can be extracted rapidly and precisely.

In a hexavalent chrome extracting method according to the present invention, a positive and a negative voltage are alternately applied to the workpiece having a film where the hexavalent chrome remains. By virtue of this feature, hexavalent chrome can be extracted efficiently and precisely.

Moreover in a hexavalent chrome extracting method according to the present invention, the hexavalent chrome extracted from the film where hexavalent chrome remains is moved into the electrolyte and the hexavalent chrome is contacted with the reducing agent so as to be reduced to a trivalent chrome. By virtue of this feature, extraction of the hexavalent chrome and reduction of the same to the trivalent chrome can be performed in a reasonable manner.

A hexavalent chrome extracting method according to the present invention comprises contacting a workpiece having a film where hexavalent chrome remains with a liquid or fine particle reducing agent and extracting the hexavalent chrome from the film. Accordingly, the hexavalent chrome can be extracted from a tangible workpiece where hexavalent chrome remains easily, rapidly and inexpensively.

Moreover, in a hexavalent chrome extracting method according to the present invention, the workpiece having a film where the hexavalent chrome remains is contacted with the reducing agent while maintaining a strictly or approximately strictly original shape of the workpiece. Accordingly, the hexavalent chrome can be extracted basically in the prior-processing state of the solid workpiece and without crushing the raw material or without pulverizing the same. Thus, an easy, rapid and inexpensive extracting method is realized, and the mass production of the extracting process can be met.

Moreover, in a hexavalent chrome extracting method according to the present invention, the workpiece having a film where the hexavalent chrome remains after chromate processing or before discarding is contacted with the reducing agent. Accordingly, this method is suited for extraction of hexavalent chrome remaining in the chromate film or chrome plating film. An extracting process can be met both in the producing process of the workpiece or in the discarding process of the same. Thus, the part where the hexavalent chrome remains can be processed properly, and such part can be used and discarded safely, thereby preventing the environmental pollution and adverse effect to a human body. Thus, this method can cope with the expected WEEE instructions, RoHS instructions and the like, as well as the expected restriction in Japan.

In a hexavalent chrome extracting method according to the present invention, the workpiece having a film where the hexavalent chrome remains is immersed in the reducing agent and ultrasonic sound waves are emitted to the reducing agent. Accordingly, by using the ultrasonic sound waves together with the reducing agent for extracting the hexavalent chrome, the hexavalent chrome can be extracted rapidly and precisely.

In a hexavalent chrome extracting method according to the present invention, the hexavalent chrome extracted from the film where hexavalent chrome remains is reduced to trivalent chrome through the reducing agent. Accordingly, the reducing agent can be used both for extraction of hexavalent chrome and for reduction of the same to trivalent chrome. Thus, the reducing agent can be utilized in a reasonable manner.

A hexavalent chrome extracting method according to another aspect of the present invention comprises contacting a workpiece having a film where hexavalent chrome remains with a liquid or fine particle electrolyte, applying a positive or negative voltage to the workpiece and extracting the hexavalent chrome from the film. Accordingly, by forcibly and rapidly extracting the hexavalent chrome remaining in the workpiece, the performance of extracting process can be enhanced and the extracting precision can also be enhanced.

In a hexavalent chrome extracting method according to the present invention, the workpiece having a film where the hexavalent chrome remains is contacted with the electrolyte while maintaining a strictly or approximately strictly original shape of the workpiece. Accordingly, the hexavalent chrome can be extracted basically in the prior-processing state of the solid workpiece and without crushing the raw material or without pulverizing the same. Thus, an easy, rapid and inexpensive extracting method is realized, and the mass production of the extracting process can be met.

Moreover, in a hexavalent chrome extracting method according to the present invention, the workpiece having a film where the hexavalent chrome remains after chrome plating or before discarding is contacted with the electrolyte. Accordingly, this method is suited for extraction of hexavalent chrome remaining in the chromate film or chrome plating film. An extracting process can be met both in the producing process of the workpiece or in the discarding process of the same. Thus, the part where the hexavalent chrome remains can be processed properly, and such part can be used and discarded safely, thereby preventing the environmental pollution and adverse effect to a human body. Thus, this method can cope with the expected WEEE instructions, RoHS instructions and the like, as well as the expected restriction in Japan.

In a hexavalent chrome extracting method according to the present invention, the workpiece having a film where the hexavalent chrome remains is immersed in the electrolyte and ultrasonic sound waves are emitted to the electrolyte. Accordingly, by using the ultrasonic sound waves together with the electrolyte for extracting the hexavalent chrome, the hexavalent chrome can be extracted rapidly and precisely.

In a hexavalent chrome extracting method according to the present invention, a positive and a negative voltage are alternately applied to the workpiece having a film where the hexavalent chrome remains. Accordingly, hexavalent chrome can be extracted efficiently and precisely.

In a hexavalent chrome extracting method according to the present invention, the hexavalent chrome extracted from the film where hexavalent chrome remains is moved into the electrolyte and the hexavalent chrome is contacted with the reducing agent so as to be reduced to a trivalent chrome. Accordingly, extraction of the hexavalent chrome and reduction of the same to the trivalent chrome can be performed in a reasonable manner.

DETAILED DESCRIPTION OF THE INVENTION

Figure 1:
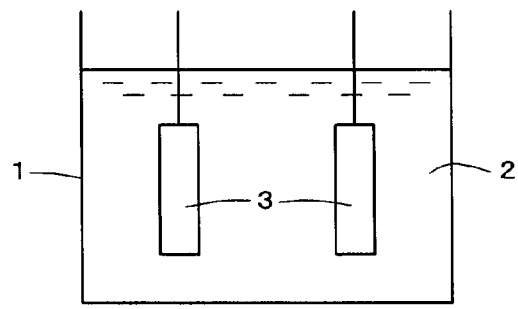
FIG. 1 is a front view in which the present invention is applied to extraction of hexavalent chrome remaining in a chromate film, showing a status wherein a chromate-processed part is immersed in a reducing agent to extract a hexavalent chrome and the hexavalent chrome thus extracted is reduced to a trivalent chrome.

One embodiment shown in the drawings will be hereinafter described in which the present invention is applied to extraction of hexavalent chrome remaining in a passivated chromate film coated on the surface of a raw material (workpiece) to be processed after the surface of the workpiece is subjected to chromate processing. In FIG. 1, reference numeral 1 denotes a reaction vessel. A diluted eluent (having a concentration of 5% in this embodiment) of a reducing agent 2 such as sodium pyrosulfite, is received in the vessel 1 under normal temperature and normal pressure. A raw material (workpiece) 3 to be processed which is made of nonferrous metal and whose surface is subjected to chromate processing is immersed in the reducing agent 2.

Extracting processing of the hexavalent chrome thus constructed is executed in a hexavalent chrome extracting step after the workpiece 3 is subjected to chromate processing or in a processing step before discarding the workpiece 3 used with lapse of time.

For extracting the hexavalent chrome, the reaction 1 for receiving the reducing agent 2 is prepared, and a suitable reducing agent 2, which is commercially available, is diluted and received in the reaction vessel 1. Then, the workpiece 3 is immersed in the reducing agent 2 basically as it is, in other words, while maintaining a strictly or approximately strictly original shape of the workpiece 3 and without crushing or pressure-crushing the workpiece 3.

Accordingly, since the workpiece 3 can be received in the reducing agent 2 as it is, the originally intended utilization, in case the hexavalent chrome is extracted after chromate processing, can be obtained without deforming the workpiece 3 after the extraction of hexavalent and in case the hexavalent chrome is extracted before discarding of the workpiece 3, extraction can be executed easily and rapidly without a need of time and labor for crushing the workpiece 3 or pulverizing the same.

When the workpiece 3 having the chromate film is immersed in the reducing agent 2 in the manner as mentioned, reducing reaction by the reduction agent 2 starts. That is, when the hexavalent chrome remaining in the chromate film is contacted with the reducing agent 2, it is reduced to trivalent chrome and dispersed into the reducing agent 2.

This status can be recognized by change in color of the chromate film. That is, the chromate film exhibits a red color before the reducing processing and the color is changed into a white color as the reducing processing progresses. When the color change of the chromate film into white is recognized, extraction of the hexavalent chrome is finished, and the workpiece 3 after extraction is pulled out of the reducing agent 2. In the experiments carried out by the inventor, it was confirmed that time required for carrying out a series of extraction of the hexavalent chrome was about 10 to 15 seconds.

After extraction of the hexavalent chrome, the hexavalent chrome is reduced and the trivalent chrome is dispersed into the reducing agent 2 and the concentration of alkali is reduced. Since any adverse effect to a human body can be neglected, there is no worry about deterioration of working environment and environmental pollution. Thus, the effluent can be discarded directly without a need of effluent processing.

Since, in this embodiment, extraction of the hexavalent chrome and reduction of the extracted hexavalent chrome into the trivalent chrome are executed by the same reducing agent 2, the reducing agent 2 can be utilized effectively and a reasonable processing can be realized.

With respect to the above-mentioned hexavalent chrome extracting method, the inventor carried out the following hexavalent chrome eluding experiments. That is, two workpieces after being subjected to chromate processing and which is made of aluminum, were prepared. Those workpieces were immersed in the reducing agent 2 for 10 seconds or 3 minutes and then, transferred to a beaker and heated. Then, each testpiece was immersed in a boiled water for about 5 minutes and determined whether or not hexavalent chrome was eluted using a detecting chemical which is known.

As a result, hexavalent chrome was recognized to be eluted out of the workpiece 3 which was immersed in the reducing agent 2 for 10 seconds but no hexavalent chrome was recognized to be eluted out of the workpiece 3 which was immersed in the reducing agent 2 for 3 minutes.

From this, it was confirmed that hexavalent chrome can be prevented from being eluted out of the workpiece 3 by immersing the workpiece 3 after being subjected to chromate processing in the reducing agent 2 for a predetermined time or longer.

In case the time required for immersion is a predetermined time or shorter, the hexavalent chrome remaining in the chromate film is insufficiently reduced to trivalent chrome and therefore, the non-reduced hexavalent chrome is most likely to be eluted.

FIGS. 2 through 5 show other embodiments of the present invention, in which the components corresponding to those of the preceding embodiment are denoted by identical reference numerals.

Figure 2:
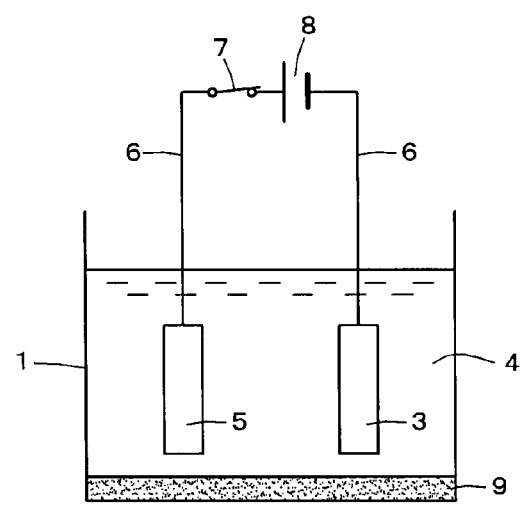
FIG. 2 is a front view in which the present invention is applied to extraction of hexavalent chrome remaining in a chrome-plated part, showing a status wherein a chrome-plated part is immersed in an electrolyte so as to be cathodized and the hexavalent chrome thus extracted is reduced to a trivalent chrome.

Of them, FIG. 2 shows a second embodiment of the present invention. An electrolyte 4, in this embodiment, is received in a reaction vessel 1 under normal temperature and normal pressure. Used as the electrolyte 4, in this embodiment, is a commercially available alkaline electrolytic washing liquid properly diluted with water.

A workpiece 3 and an anodic plate 5 formed of an iron plate and serving as an electrode plate are immersed in the electrolyte 4 and an conductive wire 6 is connected thereto. A switch 7 and a power source 8 are inserted in the conductive wire 6. The cathodic side of the power source 8 is connected to the workpiece 3.

The workpiece 3 is plated with chrome. The plated film is caused to exhibit a mat or porous shape by metallic chrome and chrome oxide, so that hexavalent chrome or hexavalent chrome ions remaining in the surface or pore of the plating can be extracted.

In the above-mentioned FIGURE, reference numeral 9 denotes a reducing agent, like one in the preceding embodiment, such as sodium pyrosulfite which is charged to the reaction vessel 1. The timing for charging such reducing agent 9 is coincident with, for example, the timing for starting electrophoresis. Otherwise, the reducing agent 9 may be preliminarily charged to the reaction vessel 1.

In case the hexavalent chrome or hexavalent chrome ions remaining in the workpiece 3 is extracted in this embodiment, such extraction is executed in a hexavalent chrome extracting step after chrome plating or a processing step before discharging the workpiece 3 which has been subjected to aging use.

For extracting the hexavalent chrome, the prescribed electrolyte 4 is received in the reaction vessel 1, the chrome-plated workpiece 3 and the anodic plate 5 are immersed in the electrolyte 4 and the cathodic or anodic side of the power source 8 is connected thereto.

In this case, the workpiece 3 is, as in the preceding embodiment, immersed in the electrolyte 4 basically as it is, without being crushed or pressure-crushed.

Accordingly, since the workpiece 3 can be received in the electrolyte 4 as it is, the workpiece 3, in case hexavalent chrome is extracted after chrome plating, can be utilized in an originally intended shape without deformation, and in case hexavalent chrome is extracted before discarding, hexavalent chrome can be extracted easily and rapidly without a need of time and labor for crushing the workpiece 3.

In the manner as mentioned above, the chrome-plated workpiece 3 is immersed in the electrolyte 4, a switch 7 is turned on, a negative voltage is applied to the workpiece 3 and a positive voltage is applied to the anodic plate 5, on the cathode side, electron is supplied from the power source 8 and reduction is taken place and hydrogen ions in the electrolyte 4 are reduced and hydrogen is generated, and on the anode side, electron is emitted from the power source 8, water in the electrolyte 4 is oxidized and oxygen is generated.

Under such cathodic electrolysis, the hexavalent chrome remaining in the chrome plating is negatively charged and this hexavalent chrome is electrophoresed in a direction of the anodic plate 5 which is imparted with opposite charge and dispersed in the electrolyte 4.

At that time, the hexavalent chrome is agitated by the generated hydrogen and uniformly dispersed in the electrolyte 4.

When hydrogen and oxygen are generated and the hexavalent chrome ions start electrophoresis or dispersion, the reducing agent 9 is charged into the reaction vessel 1 and contacted with the hexavalent chrome so that the hexavalent chrome is reduced to trivalent chrome.

Accordingly, since poisonous property caused by hexavalent chrome is disappeared and any adverse effect to a human body can be disregarded, there is no worry about deterioration of working environment and environmental pollution. Thus, basically, no effluent processing is required and the effluent can be discarded as it is.

The reducing agent 9 may be preliminarily charged into the reaction vessel 1. By doing so, there is no trouble for managing the charging operation and charging time of the reducing agent 9.

Figure 3:
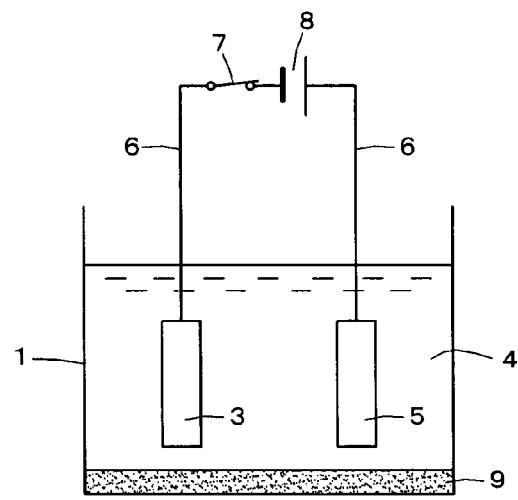
FIG. 3 is a front view in which the present invention is applied to extraction of hexavalent chrome remaining in a chrome-plated part, showing a status wherein a chrome-plated part is immersed in an electrolyte so as to be anodized and the hexavalent chrome thus extracted is reduced to a trivalent chrome.

FIG. 3 shows a third embodiment of the present invention. In this embodiment, a workpiece 3 and an electrode plate 5 are charged with voltage in an opposite direction to the preceding embodiment. Owing to this arrangement, the workpiece 3 is imparted with positive voltage and electron is emitted from a power source 8 to the workpiece 3 to oxidize the water in an electrolyte 4 so that oxygen is generated.

Under such anodic electrolysis, the hexavalent chrome remaining in chrome plating is imparted with positive charge, and this hexavalent chrome is electrophoresed in a direction of the electrode plate 5 which is imparted with the opposite charge and dispersed in the electrolyte 4.

At that time, the hexavalent chrome is agitated by the generated oxide and uniformly dispersed in the electrolyte 4. The hexavalent chrome is contacted with the reducing agent 9 so that the hexavalent chrome is reduced to trivalent chrome, thereby an originally intended effect is obtained.

In this case, the direction of the imparting voltage with respect to the workpiece 3 can be made changeable, and the ratio between the cathode energizing time and the anode energizing time can be made adjustable depending on the component composition of the electrolyte 4 and the polluting status. By doing so, since an alternating voltage is applied to the workpiece 3 and the charge of the remaining hexavalent chrome ions is imparted thereon in an alternating manner, the hexavalent chrome ions are alternately electrophoresed to the anode or cathode side, and the hexavalent chrome is extracted precisely and reliably and reduced to trivalent chrome precisely and efficiently through the reducing agent 9.

Figure 4:
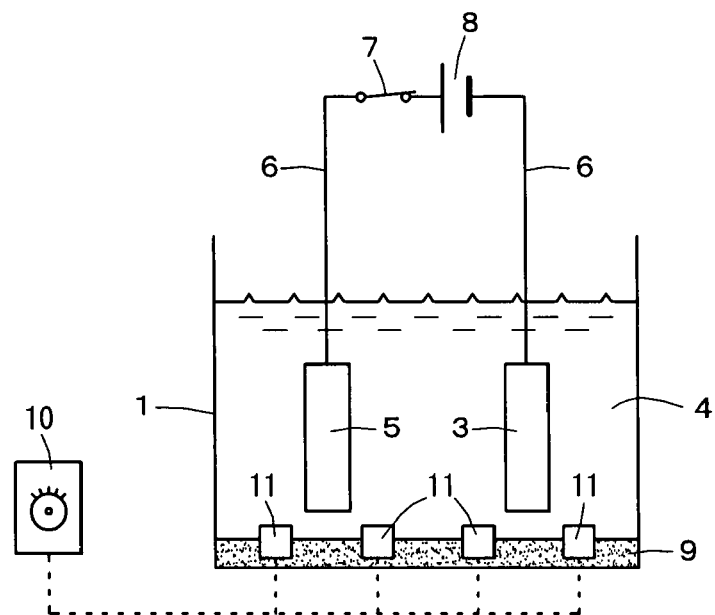
FIG. 4 shows a status wherein a ultrasonic sound wave emitting method is used in combination with the hexavalent chrome extracting method according to the cathodizing method of FIG. 2, in order to extract a hexavalent chrome remaining in a chrome-plated part and to reduce the hexavalent chrome thus extracted to a trivalent chrome.

FIG. 4 shows a fourth embodiment of the present invention. This embodiment is such constructed that in the second or third embodiment or in the afore-mentioned application mode wherein the alternating voltage is applied, a ultrasonic transmitter 10 is disposed at a location proximate to the reaction vessel 1 and a plurality of ultrasonic vibrators 11, which are actuated in association with the transmitter 10, are installed at a bottom part or side part within the reaction vessel 1.

Then, many tiny air bubbles are generated by the ultrasonic vibrators 11, so that agitation of the reducing agent 2, or of the electrolyte 4 and the reducing agent 9 is promoted. Then, by shock waves generated when the air bubbles are disappeared, extraction and movement of the hexavalent chrome remaining in the workpiece 3 are promoted, extracting precision of the hexavalent chrome is enhanced and reducing action of the hexavalent chrome to trivalent chrome is performed energetically and delicately.

With respect to the hexavalent chrome extracting method, the inventor carried out the following experiments for eluting or extracting hexavalent chrome. That is, as a testpiece, a plurality of the afore-mentioned chrome-plated or aluminum-made workpieces 3 were prepared Then, one of the workpieces 3 was immersed in a pure water of 1,000 ml and heated. After the pure water was boiled and condensed to about 100 ml, it was measured whether or not the hexavalent chrome was eluted in the pure water. As a result, hexavalent chrome having a concentration of 2 ppm or more was measured.

Next, after another testpiece was immersed in the reducing agent 9 having a concentration of 10%, it was immersed in a pure water of 1,000 mL and heated. The pure water was then boiled and condensed to about 100 mL and thereafter, it was measured whether or not hexavalent chrome was eluted in the pure water. As a result, hexavalent chrome having a concentration of 2 ppm or more was measured.

Moreover, still another testpiece was immersed in the reducing agent 9 having a concentration of 10%. At that time, ultrasonic waves were emitted to the testpiece for 1 minute and thereafter, the testpiece was immersed in a pure water of 1,000 mL and heated. Then, after the pure water was boiled and concentrated to about 100 mL, it was measured whether or not hexavalent chrome was eluted in the pure water. As a result, hexavalent chrome having a concentration of 2 ppm or more was measured.

Moreover, still another testpiece was immersed in the electrolyte 4. After the testpiece was cathode electrolyzed for 1 minute, it was immersed in a pure water of 1,000 mL and boiled. Then, after the pure water was boiled and condensed to a concentration of about 100 mL, it was measured whether or not hexavalent chrome was eluted in the pure water. As a result, hexavalent chrome having a concentration of 0.5 ppm was measured.

Moreover, still another testpiece was immersed in the electrolyte 4. After the testpiece was cathode electrolyzed for 2 minutes, it was immersed in a pure water of 1,000 mL and boiled. Then, after the pure water was boiled and condensed to a concentration of about 100 mL, it was measured whether or not hexavalent chrome was eluted in the pure water. As a result, hexavalent chrome having a concentration of 0.3 ppm was measured.

Moreover, still another testpiece was immersed in the electrolyte 4. After the testpiece was cathode electrolyzed for 3 minutes, it was immersed in a pure water of 1,000 mL and boiled. Then, after the pure water was boiled and condensed to a concentration of about 100 mL, it was measured whether or not hexavalent chrome was eluted in the pure water. As a result, hexavalent chrome having a concentration of 0.05 ppm or less was measured.

Moreover, still another testpiece was immersed in the electrolyte 4 for cathode electrolysis. At that time, ultrasonic waves were emitted to the testpiece for 3 minutes. After the testpiece was cathode electrolyzed, it was immersed in a pure water of 1,000 mL and heated. Then, after the pure water was boiled and concentrated to about 100 mL, it was measured whether or not hexavalent chrome was eluted in the pure water. As a result, hexavalent chrome having a concentration of 0.05 ppm or less was measured.

Moreover, still another testpiece was immersed in the electrolyte 4. At that time, ultrasonic waves were emitted to the testpiece for 1 minute. After the testpiece was cathode electrolyzed, it was immersed in a pure water of 1,000 mL and heated. Then, after the pure water was boiled and concentrated to about 100 mL, it was measured whether or not hexavalent chrome was eluted in the pure water. As a result, hexavalent chrome having a concentration of 0.1 ppm was measured.

In the above-mentioned experiments, the eluting concentration of hexavalent chrome is lowered by the cathode electrolysis method shown in FIG. 2. The effect have some relation with the cathode electrolyzing time. When the cathode electrolyzing time is 1 minute, the eluting concentration is 0.5 ppm; 2 minutes, 3 ppm; and 3 minutes, 0.05 ppm or less, respectively. From this, it can be confirmed that all of those values of concentration are equal to or less than the value of 0.5 ppm restricted by law.

Moreover, by additionally using the ultrasonic wave emitting method in combination with the cathode electrolysis method, the eluting concentration of hexavalent chrome becomes the law-restricting value of 0.5 ppm or less. Thus, the law restriction is satisfied and the extracting precision of hexavalent chrome is enhanced.

Figure 5:
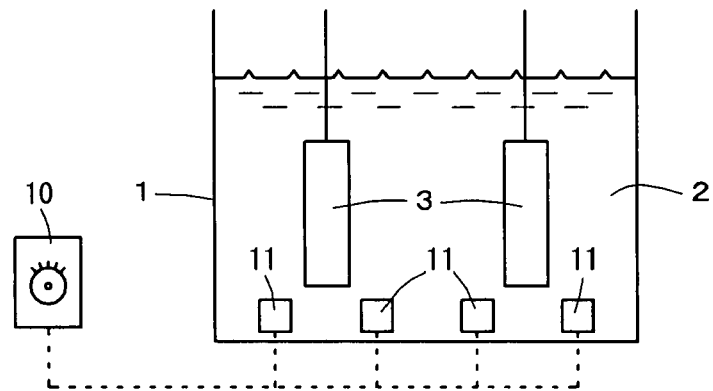
FIG. 5 shows a status wherein a ultrasonic sound wave emitting method is used in combination with the hexavalent chrome extracting method according to the cathodizing method of FIG. 2, in order to extract a hexavalent chrome remaining in a chromate film and to reduce the hexavalent chrome thus extracted to a trivalent chrome.

FIG. 5 shows a fifth embodiment of the present invention. In this embodiment, the ultrasonic wave emitting method is used in combination with the first embodiment. A ultrasonic transmitter 10 is disposed at a location proximate to a reaction vessel 1 in which a reducing agent 2 is received, and a plurality of ultrasonic vibrators 11, which are actuated in association with the transmitter 10, are installed at a bottom part or side surface within the reaction vessel 1.

Then, many tiny air bubbles are generated by the ultrasonic vibrators 11, so that agitation of the reducing agent 2 is promoted. Then, by shock waves generated when the air bubbles are disappeared, extraction and movement of the hexavalent chrome remaining in the workpiece 3 are promoted, extracting precision of the hexavalent chrome is enhanced and reducing action of the hexavalent chrome to trivalent chrome is performed energetically and efficiently.

In any of the above-mentioned embodiments, the workpiece 3 is immersed in the reducing agent 2, or in the electrolyte 4 and/or reducing agent 9. However, the present invention is not limited to this. It is also accepted that the reducing agent 9 is formed in a fine-particulate shape and the workpiece 3 is contacted therewith.

As described hereinbefore, a hexavalent chrome extracting method according to the present invention is capable of reliably and cost-efficiently extracting hazardous hexavalent chrome remaining on the surface or inside of chrome plating or chromate film without a need of a special and expensive equipment, preventing elution of the hexavalent chrome from a raw material to be processed, enjoying safe use and discarding of the part where the hexavalent chrome remains, and preventing environmental pollution and adverse effect to a human body.

The invention claimed is:

1. A method of extracting hexavalent chrome, comprising the steps of:
    immersing a workpiece having a film comprising hexavalent chrome in an electrolyte in a reaction vessel;
    applying a positive and negative voltage to the workpiece, performing electrophoresis on hexavalent chrome ions extracted from the film in the electrolyte;
    adding a reducing agent to the reaction vessel before or during electrophoresis;
    contacting the hexavalent chrome ions with the reducing agent, whereby the hexavalent chrome ions are reduced to trivalent chrome ions;
    installing a plurality of ultrasonic wave vibrators on at least one of a bottom and an inner side of the reaction vessel; and
    agitating the electrolyte and the reducing agent with the ultrasonic wave vibrators, whereby the extraction and movement of the hexavalent chrome is promoted by shock wave generated when air bubbles are eliminated.

2. The method of claim 1, further comprising the step of adding the reducing agent to the reaction vessel when hydrogen or oxygen is generated by electrolyzing the electrolyte and when the hexavalent chrome ions start electrophoresis in the electrolyte.

3. The method of claim 1, further comprising the step of agitating the hexavalent chrome with hydrogen or oxygen generated by electrolyzing the electrolyte.

4. The method of claim 1, wherein a positive and negative voltage are alternately applied to the workpiece.

* * * * *